United States Patent
Mottier et al.

(10) Patent No.: US 11,187,275 B2
(45) Date of Patent: Nov. 30, 2021

(54) DEVICE FOR CONNECTING A STEERING COLUMN TO A STEERING GEAR HOUSING

(71) Applicant: Robert Bosch Automotive Steering Vendôme SAS, Vendôme (FR)

(72) Inventors: Emmanuel Mottier, Aze (FR); Benjamin Coudere, Vendôme (FR); Olivier Coulon, Villebarou (FR)

(73) Assignee: Robert Bosch Automotive Steering Vendome SAS

( * ) Notice: Subject to any disclaimer, the term of this patent is extended or adjusted under 35 U.S.C. 154(b) by 986 days.

(21) Appl. No.: 15/836,314

(22) Filed: Dec. 8, 2017

(65) Prior Publication Data

US 2018/0100547 A1     Apr. 12, 2018

Related U.S. Application Data

(63) Continuation of application No. 14/240,787, filed as application No. PCT/FR2012/051705 on Jul. 18, 2012, now Pat. No. 9,863,479.

(30) Foreign Application Priority Data

Aug. 31, 2011  (FR) ...................................... 1157704

(51) Int. Cl.
  *F16D 3/38*    (2006.01)
  *B62D 1/20*    (2006.01)
  *F16D 1/033*   (2006.01)

(52) U.S. Cl.
  CPC ............... *F16D 3/387* (2013.01); *B62D 1/20* (2013.01); *F16D 1/033* (2013.01); *Y10T 403/7062* (2015.01); *Y10T 403/7188* (2015.01)

(58) Field of Classification Search
  CPC ....... B62D 1/20; F16D 1/0852; F16D 1/0864; F16D 3/387; Y10S 464/905; Y10T 403/535; Y10T 403/7182; Y10T 403/7188
  (Continued)

(56) References Cited

U.S. PATENT DOCUMENTS 2,910,842 A    11/1959   Sensenig
4,505,608 A *   3/1985   Haldric ................... F16D 3/387
                                                         403/13

(Continued)

FOREIGN PATENT DOCUMENTS

EP        0128813 A1   12/1984
JP        3056936 B2 *  6/2000 ............. F16D 3/387
WO    WO 2007119026 A1  10/2007

OTHER PUBLICATIONS

Search Report dated Nov. 20, 2012 for PCT Application No. PCT/FR2012/051705, 2 pages.

(Continued)

*Primary Examiner* — Josh Skroupa
(74) *Attorney, Agent, or Firm* — Patterson Thuente Pedersen, P.A.

(57) ABSTRACT

A device for connecting a steering column to a steering gear housing comprising a shaft (2) having an end portion (20), a clamping collar (1) comprising two arms (10, 11) arranged relative to one another in such a way as to delimit a cavity (3) able to guide the shaft (2) into a position of engagement and keep the shaft (2) in the engaged position, and means (16) for clamping the arms (10, 11) onto the shaft in the engaged position with a set torque, the cavity (3) comprising a coupling zone (4) and an entry zone (5) situated to the rear of the coupling zone in the direction of insertion and dimensioned in relation to the coupling zone (4) in such a way as to prevent the clamping means from being clamped to the set torque when the end portion is situated in the entry zone (5).

18 Claims, 8 Drawing Sheets

(58) Field of Classification Search
USPC ......... 403/290, 398, 399; 464/134, 135, 905
See application file for complete search history.

(56) References Cited

U.S. PATENT DOCUMENTS

| | | |
|---|---|---|
| 5,018,899 A | 5/1991 | Kuribara et al. |
| 6,272,946 B1 | 8/2001 | Roux |
| 7,066,679 B2 | 6/2006 | Audibert et al. |
| 7,727,074 B2 | 6/2010 | Laisement et al. |
| 8,262,309 B2 * | 9/2012 | Dallara ................... F16D 3/387 403/290 |
| 8,845,438 B2 * | 9/2014 | Moriyama .............. F16D 3/387 464/134 |
| 9,168,945 B2 | 10/2015 | Hiesse et al. |
| 9,487,228 B2 | 11/2016 | Febre et al. |
| 9,863,479 B2 | 1/2018 | Mottier et al. |
| 2003/0161679 A1 | 8/2003 | Whitton et al. |
| 2005/0105966 A1 | 5/2005 | Audibert et al. |

OTHER PUBLICATIONS

Application and File history for U.S. Appl. No. 14/240,787, filed Feb. 28, 2014. Inventors: Mottier et al.

* cited by examiner

DEVICE FOR CONNECTING A STEERING COLUMN TO A STEERING GEAR HOUSING

RELATED APPLICATIONS

This application is a continuation of application Ser. No. 14/240,787 filed Feb. 28, 2014, which is a National Phase entry of PCT Application No. PCT/FR2012/051705 filed Jul. 18, 2012, which claims priority from French Application No. 1157704 filed Aug. 31, 2011, each of which is hereby fully incorporated herein by reference.

The invention relates to a device for connecting two shafts together.

The device for connecting according to the invention is intended in particular, but not exclusively, to be implemented in a steering system to couple means for controlling, and more particularly a steering column, to a steering gear housing.

In a motor vehicle, the means for controlling of the steering system comprise a steering wheel and a steering column comprising a steering shaft integral a steering with the steering wheel. The steering gear housing comprises a pinion gear meshing with a rack arranged along a steering cross shaft connected on either side to the steering wheels by a set of steering tie-rods, with the translation of the cross shaft driving the rotation of the steering wheels of the motor vehicle.

The steering shaft of the steering column is connected to the pinion of the steering gear housing by an intermediate transmission shaft. The steering column and the intermediate transmission shaft on the one hand as well as the intermediate transmission shaft and the steering gearbox on the other hand are then respectively connected by a device for connecting comprising a clamping collar, commonly referred to as jaw or universal joint.

The clamping collar conventionally comprises per se two arms arranged relative to one another in such a way as to delimit a cavity to receive an end portion of one of the shafts to be coupled with the other shaft. The clamping arms each comprise a hole for the passage of a clamping screw intended to clamp the clamping arms around the end portion of the shaft according to a set torque.

In order to provide a sufficient clamping of the screw and as such apply sufficient tension in the connection sought, i.e. the connection between the steering column and the intermediate shaft and/or the connection between the intermediate shaft and the steering gearbox, and as such allow for a resistance in terms of dynamic endurance for the connection, it is required that the clamping collar be sufficiently engaged on the shaft concerned by the coupling.

However, in certain circumstances, it occurs that the clamping collar is not sufficiently engaged on the shaft, with the end portion of the shaft not reaching the holes for the passage of the jaw. As the clamping screw is able to be arranged through the holes for passage, the coupling is apparently carried out. However, as the shaft is not sufficiently engaged in the clamping collar, the maintaining of the latter on the shaft is not ensured.

In order to prevent a poor engagement or insufficient engagement of the clamping collar on a shaft, it is provided in conventional connection devices to match the collar with additional parts that do not authorise the passage of the clamping screw in the holes for the passage of the collar as long as the latter is not fully engaged. By way of example, patent application FR0128813 can be mentioned. Here, the additional part implemented in this document is an elastic member consisting of a curved blade. The blade is arranged on the jaw of the universal joint in such a way that the curved end of the blade is arranged through holes for the passage of the clamping screw. The setting in place of the clamping screw is then prevented as long as no shaft is introduced into the bore of the jaw.

The adding of an additional part gives rise however to problems of encumbrance and cost.

It is also common to prevent a poor engagement of the collar on a shaft to proceed with a machining of the chamfer type or to create a counterbore centered on the shaft.

The additional machining does however have for consequence to reduce the contact zones between the shaft and the jaw, which is detrimental for the resistance in terms of dynamic endurance in a steering system of the transmission gearbox I intermediate transmission shaft and intermediate transmission shaft I steering column connection.

The invention aims to overcome these problems by proposing a device for connecting making it possible to prevent the clamping and the axial maintaining, by the clamping screw, of the clamping collar on the shaft when the latter is not sufficiently engaged in the collar.

To this effect, and according to a first aspect, the invention proposes a device for connecting a steering column to a steering gear housing, with the device comprising a shaft defining an axis of insertion and a direction of insertion, having an end portion and a clamping portion situated to the rear of the end portion in the direction of insertion, a clamping collar comprising two arms arranged relative to one another in such a way as to delimit a cavity able to guide the shaft according to the axis of insertion in the direction of insertion into a position of engagement and to keep the shaft in the position of engagement, with each arm comprising a hole, and a clamping screw of the arms onto the shaft in the position of engagement according to a set torque, with the holes of each arm being aligned with one another in order to define with the clamping portion an axis of passage of the clamping screw perpendicular to the axis of insertion, the cavity comprising a coupling zone and an entry zone situated to the rear of the coupling zone in the direction of insertion, the entry zone being dimensioned in relation to the coupling zone in such a way as to prevent the clamping of the clamping screw according to a set torque when the end portion is situated in the entry zone.

Conventionally, the set tightening torque corresponds to an optimum tightening torque that makes it possible to generate a deformation of the arms of the clamping collar at the limit of yielding.

Advantageously, the entry zone has a section that is greater than that of the coupling zone.

The presence of an enlarged zone preceding the coupling zone in the direction of insertion of the shaft into the cavity of the clamping collar, makes it possible as such to suppress the bearing zones transmitting the forces of the arms 10, 11 onto the shaft 2 during the clamping of the screw. So, as the portion of the shaft 2 arranged in the entry zone 5 is no longer in contact with all or a portion of the internal surfaces of the clamping collar, the forces of the collar as a reaction to the clamping of the screw are not transmitted to the shaft. The set tightening torque therefore cannot be achieved.

Advantageously, the coupling zone and the entry zone have, in the lower portion, one or several bearing surfaces of the shaft.

Advantageously, the bearing surfaces of the entry zone are arranged in the extension of the bearing surfaces of the coupling zone (4) according to an axis parallel to the axis of insertion.

Advantageously, the entry zone is vertically offset in relation to the axis of insertion. This as such makes it possible to preserve lower bearing surfaces on the zone of the coupling zone but also on the entry zone. The expression "vertically offset" means an offsetting situated in a plane perpendicular to the clamping axis and passing through the axis of insertion. The presence of lower bearing surfaces makes it possible to provide for the resistance in dynamic endurance of the collar when the latter is assembled with the shaft.

Advantageously, the entry zone is horizontally offset in relation to the axis of insertion. The expression "horizontally offset" means an offsetting situated in a plane parallel to the clamping axis and passing through the axis of insertion.

According to an advantageous embodiment, it can be provided that the entry zone is offset both vertically and horizontally.

Advantageously, the holes open into the coupling zone, in the vicinity of the entry zone.

Advantageously, the cavity comprises an end defining a docking surface in the entry zone, with the entry zone (5) having a length substantially equal to the distance of the holes with the docking surface.

Advantageously, the entry zone forms a counterbore. This configuration has the advantage of simplifying the manufacturing of the clamping collar.

According to another alternative embodiment, the entry zone has a chamfered profile. This configuration has for advantage to facilitate the continuous mounting of the clamping collar on the shaft.

According to a second aspect, the invention relates to a clamping collar intended to be implemented in a device for connecting a steering column to a steering gear housing such as described hereinabove.

Other objects and advantages of the invention shall appear when reading the following description, made in reference to the annexed drawings, wherein.

For increased clarity, identical or similar elements of the various embodiments are marked with identical reference signs in all of the figures.

Figure 1:
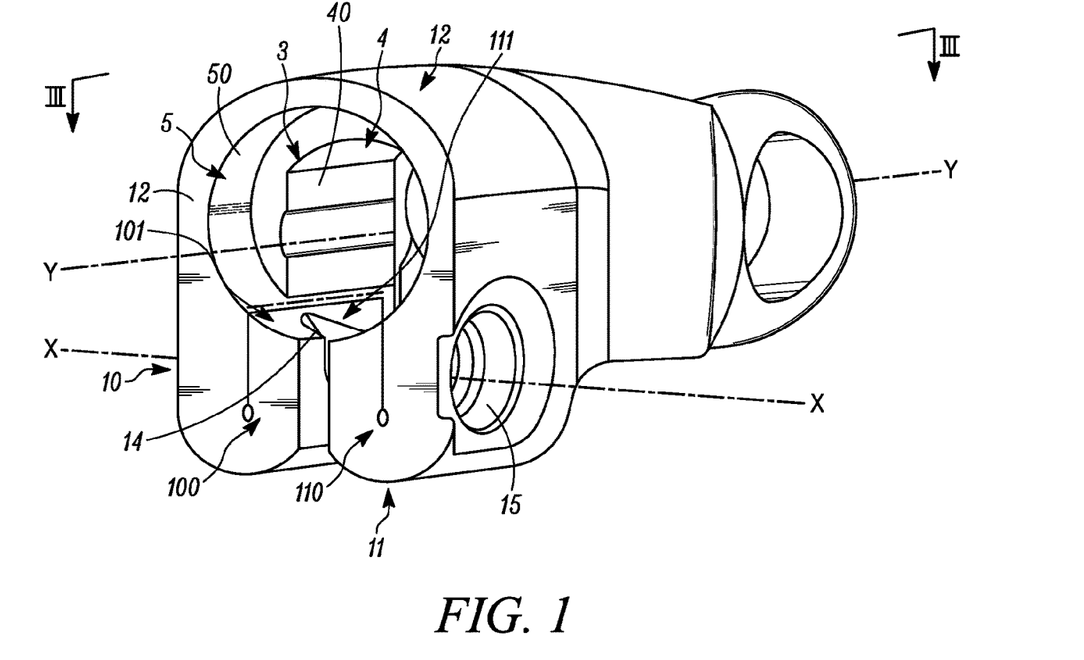
FIG. 1 shows a diagrammatical view in perspective of a device for the connecting of a steering column to a gear housing according to a first embodiment of the invention.
Figure 2:
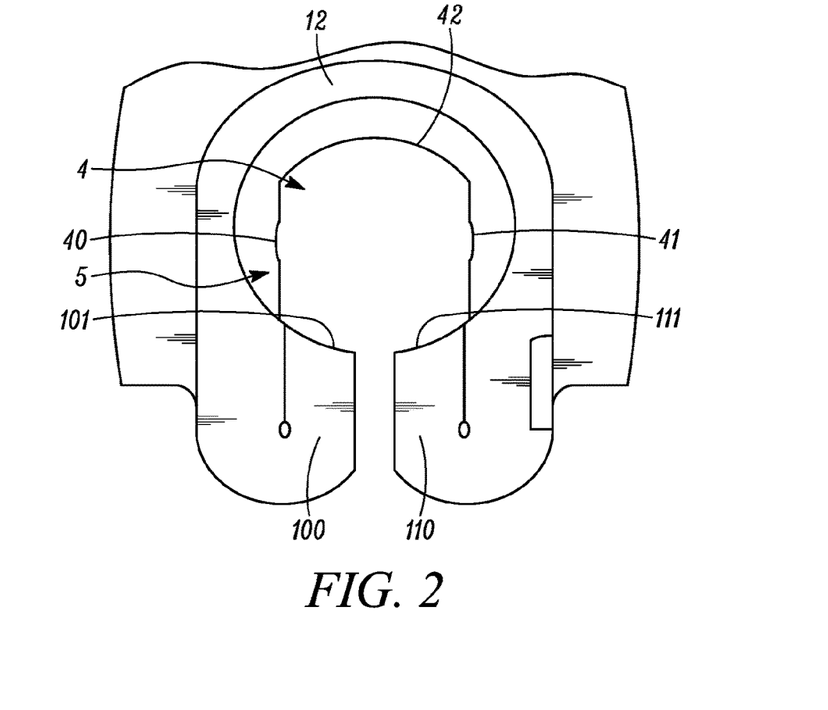
FIG. 2 shows a front view of the device for connecting of FIG. 1.
Figure 3:
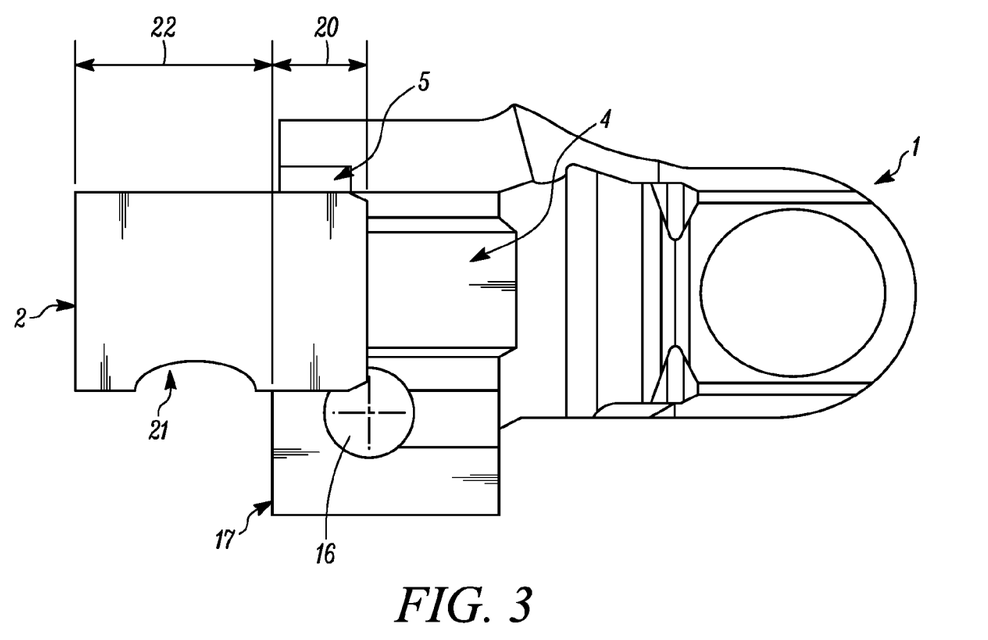
FIG. 3 shows a cross-section view according to the axis of the device for connecting of FIG. 1.

In relation with FIGS. 1 to 3, a device is described for connecting making it possible to assemble a steering column with a steering gear housing. More particularly, the device for connecting is implemented to couple the intermediate transmission shaft with the axis of the pinion of the steering gearbox and/or the intermediate transmission shaft with the steering shaft of the steering column.

In the embodiment described, the device for connecting comprises a shaft 2, a clamping collar 1 arranged to be mounted onto the shaft 2 and means for clamping comprising a screw 16 allowing for the clamping of the clamping collar 1 around the shaft 2 according to a set torque. As shall be seen further on, the clamping according to a set torque is obtained when the shaft 2 is sufficiently engaged in the collar.

According to the invention, the shaft 2, which defines an axis of insertion YY and a direction of insertion, has an end portion 20 and a clamping portion 22. As shall be seen further on, the clamping portion 22 corresponds to the portion with which the clamping screw is placed into contact in order to provide for the clamping of the collar 1 onto the shaft 2. The clamping portion 22 is situated to the rear of the end portion 20 in the direction of insertion. In other words, when the clamping collar 1 is engaged on the shaft 2, the end portion first docks the clamping collar 1.

The clamping collar 1 comprises two arms 10, 11 connected to one another by a connecting portion 12. The arms 10, 11 are arranged with the connecting portion 12 in order to delimit a cavity 3 able to receive the shaft 2, and in particular the clamping and end portions 20, 22 of the shaft 2.

Each arm 10, 11 comprises a hole 14, 15 for the passage of the clamping screw 16 intended to clamp the arms 10, 11 onto the clamping and end portions of the shaft 2. The holes 14, 15 are aligned with one another according to a clamping axis XX perpendicular to the axis of insertion of the cavity 3 corresponding to the axis of insertion of the shaft 2 when the latter is positioned in the cavity 3.

The cavity 3 according to the invention is arranged to have two adjacent zones 4, 5. As shall be seen further on, one of the zones 5 is arranged in relation to the other zone 4 in order to prevent the clamping of the clamping screw 16 according to the set torque when the clamping collar 1 is insufficiently engaged on the shaft 2 (this will be referred to in what follows as entry zone or fault-preventing zone), with the other zone 4 providing for the coupling of the clamping collar 1 onto the shaft 2 (this will be referred to in what follows as coupling zone).

According to the invention, the coupling zone 4 is intended to receive the clamping and end portions 20, 22 of the shaft 2. In this configuration wherein the two portions 20, 22 are arranged in the coupling zone 4, the clamping collar 1 is considered as correctly, or at least sufficiently engaged, on the shaft, in order to allow for the clamping of the screw 16 according to the set torque.

Figure 9:
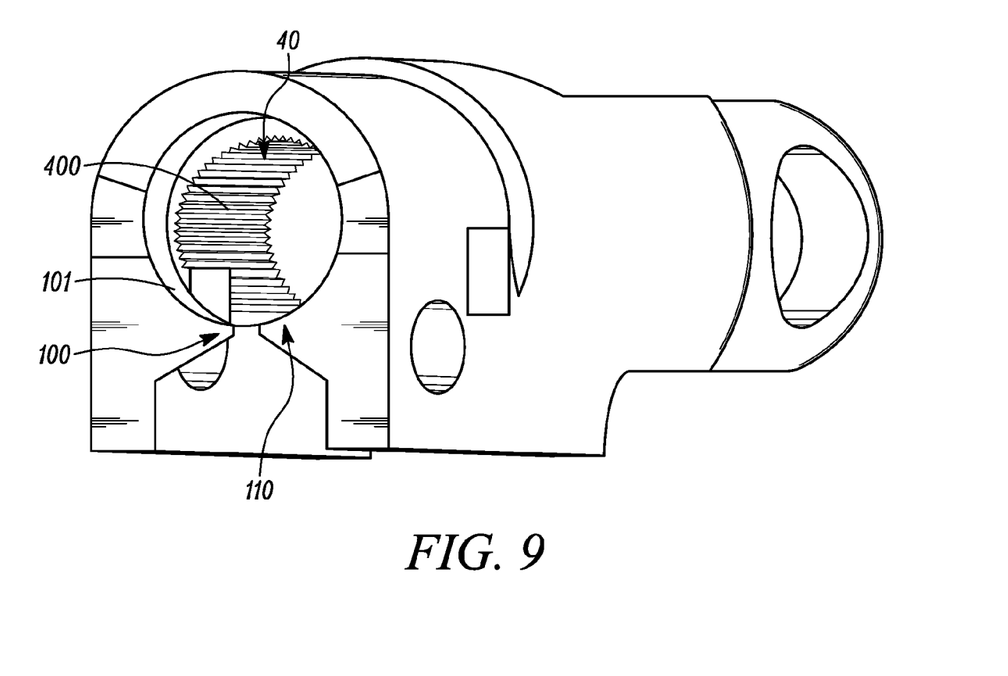
FIGS. 9, 11, 13 and 15 show alternatives of the coupling profile implemented in the device for connecting.
Figure 10:
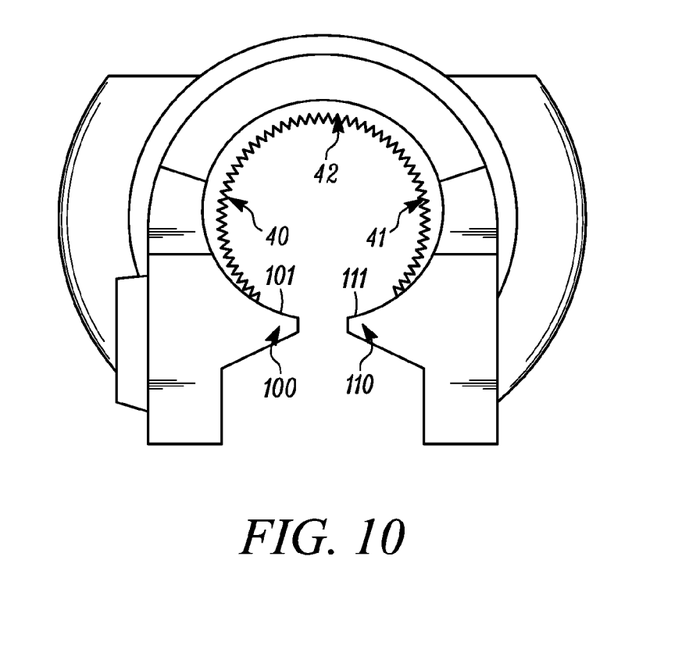
FIGS. 10, 12, 14, 16 show front views of the devices for connecting shown respectively in FIGS. 9 and 11.
Figure 11:
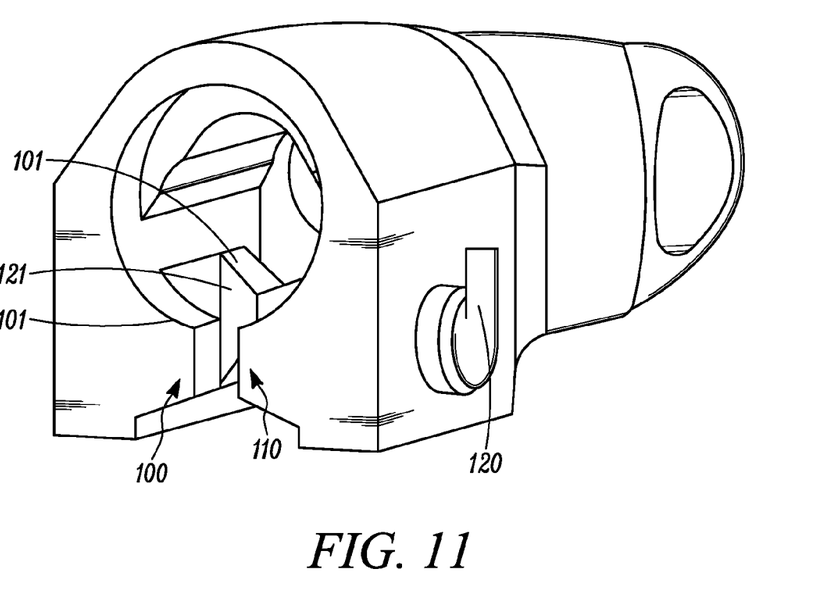
Figure 12:
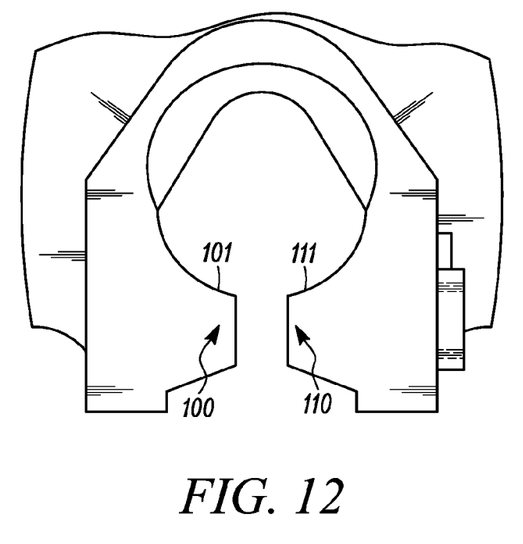
Figure 13:
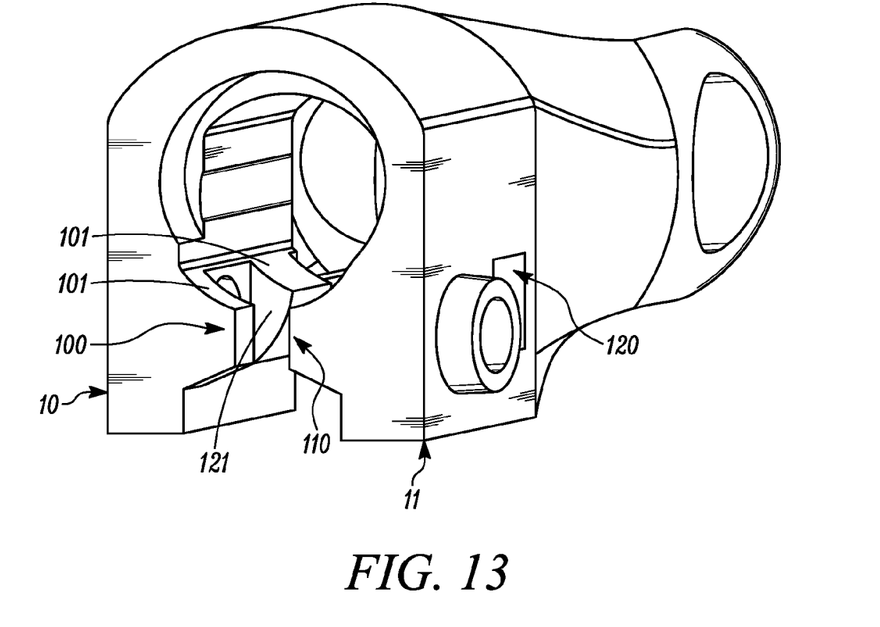
Figure 14:
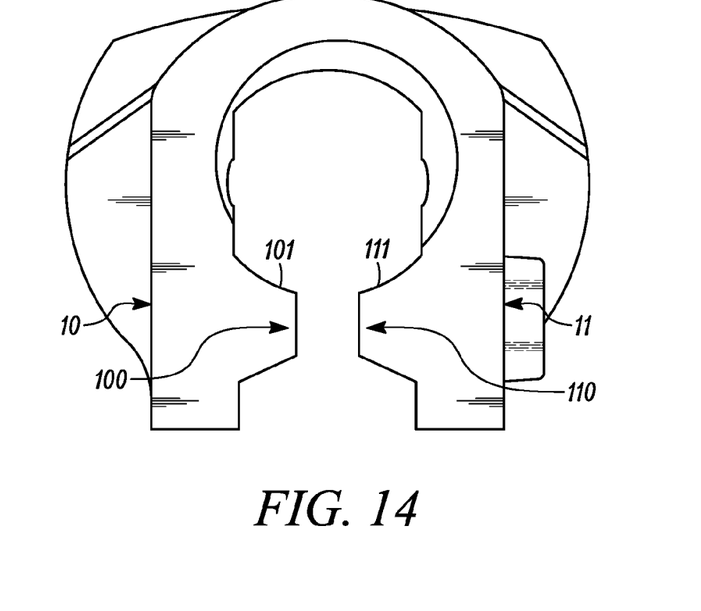
Figure 15:
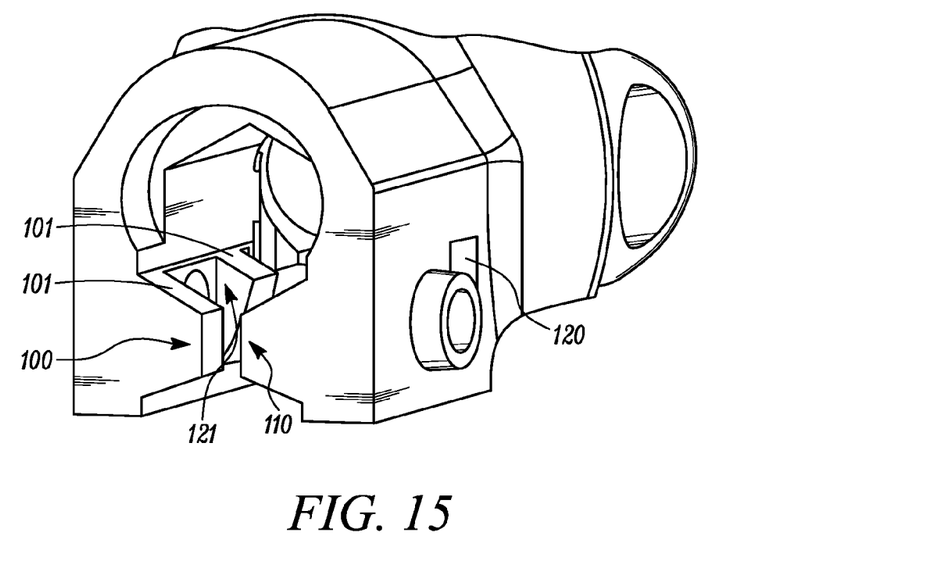
Figure 16:
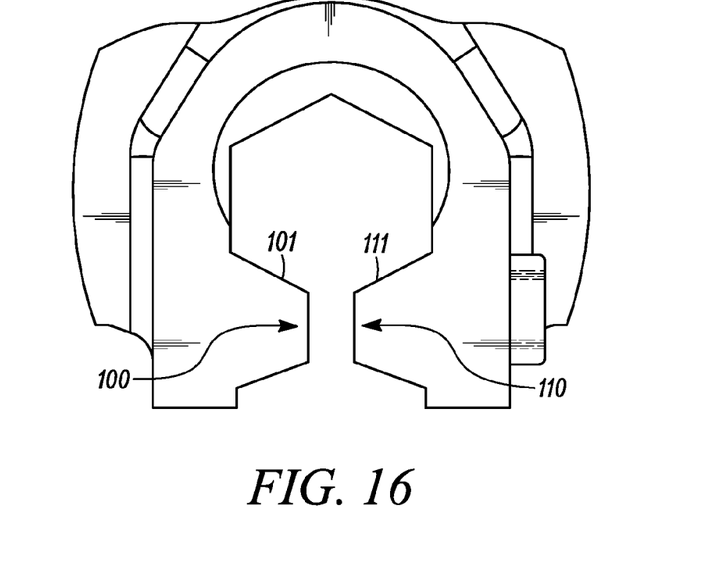

In order to provide a satisfactory connection between the clamping and end portions 20, 22 of the shaft 2 and the coupling zone 4 of the clamping collar 1, and as such provide for the transmission of the torque between the two shafts connected by the device for connecting, the coupling zone 4 has a profile that is complementary with that of the clamping and end portions 20, 22 of the shaft 2. In the embodiment described, the coupling zone 4 comprises two lateral notched walls 40, 41 able to cooperate with flats with complementary notched shapes arranged on the lateral surfaces of the end portion 20 of the shaft 2, with the two lateral notched walls 40, 41 being connected to one another by an upper connecting wall 42 in the shape of an arc of a circle corresponding to the shape of the upper surface of the end portion 20 of the shaft 2. It is of course obvious that the coupling zone 4 is not limited to such a configuration and that any shape or profile making it possible to provide for the coupling of the clamping collar 1 with a shaft can be implemented without however leaving the scope of the invention. For example, and advantageously, a coupling zone 4 can be provided of which the lateral 40, 41 and upper 42 walls are provided with splines 400 (FIGS. 9, 10). A coupling zone 4 can also be provided having a six-section wall (FIGS. 15 and 16). In this application, walls designate the entry and coupling zones, the internal surfaces of these zones.

Moreover, the coupling zone 4 and the clamping and end portions 20, 22 of the shaft 2 are dimensioned in such a way as to offer sufficient clearance in order to allow for the engagement of the clamping collar 1 on the shaft 2 while still providing for the good resistance of the latter.

In the embodiment described, each arm 10, 11 further comprises extensions 100, 110 forming one or several zones having lower bearing surfaces 101, 111 on the coupling zone 4. As such, when the clamping collar 1 is in place on the shaft 2, the clamping and end portions 20, 22 of the shaft 2 received in the coupling zone 4 are bearing respectively against the lateral walls 40, 41 and the upper wall 42 of the cavity 3 as well as against the lower bearing surfaces 101, 111.

According to the invention, the entry zone 5 is dimensioned in relation to the coupling zone 4 in order to form a fault-preventing zone 5. More particularly, the entry zone 5 is dimensioned in such a way as to prevent the clamping of the clamping screw 16 according to the set torque when the clamping collar 1 is insufficiently engaged on the shaft 2 (FIG. 3), i.e. when the end portion is not engaged into the coupling zone.

More particularly, the entry zone 5 has a section that is greater than that of the coupling zone 4. The presence of an enlargement preceding the coupling zone 4 in the direction of insertion of the shaft 2 in the cavity 3, makes it possible as such to suppress the bearing zones transmitting the forces of the arms 10, 11 on the shaft 2 during the clamping of the screw. As such, the portion of the shaft 2 arranged in the entry zone 5 cannot be maintained or clamped by the portions of the arms 10, 11 delimiting the entry zone 5.

Advantageously, the holes 14, 15 open into the coupling zone 4, in the vicinity of the entry zone 5. According to a preferred embodiment, the clamping collar 1 has an end defining a docking surface 17 in the entry zone 5, with the entry zone (5) having a length substantially equal to the distance of the holes 14, 15 with the docking surface 17.

The presence of an enlargement of the cavity 3 on holes 14, 15 and the positioning of these holes 14, 15 in relation to this enlargement makes it possible to reduce assembly errors while preventing the clamping of the clamping collar 1 on the shaft 2 when the latter is not sufficiently introduced into the cavity 3.

As such, in the case where the end portion of the shaft is not sufficiently introduced into the clamping collar 1 (FIGS. 3 and 8), the clamping screw, even if it can be engaged in the holes for passage 14, 15, cannot clamp the arms 10, 11 of the clamping collar onto the shaft 2, as no force can be transmitted between the walls of the entry zone 5 and the shaft 2. Note that if the shaft 2 is engaged in the clamping collar 1 in such a way that the end portion 20 interferes slightly with the holes 14, 15, the setting in place of the clamping screw 16 will displace the end portion 20 in the entry zone which then cannot be clamped to the set torque. Also note that, in the configuration wherein the end portion 20 is engaged in the coupling zone 4 but the clamping portion 22 is partially or not engaged in the coupling zone in such a way that the clamping portion 22 does not define with the holes 14, 15 an axis of passage for the clamping screw 16, the portion of the shaft positioned facing the holes 14, 15 will form a fault-preventing means preventing the setting into place of the clamping screw in the holes.

Advantageously, the clamping portion 20 of the shaft comprises a peripheral groove for positioning and immobilizing groove 21 provided to be positioned facing the holes 14, 15 of the clamping collar 1 when the shaft is correctly engaged in the cavity 3, i.e. when the end portion 20 and the clamping portion 22 are both situated in the coupling zone 4 of the clamping collar 1. The groove 21 makes possible, with the clamping screw 16 when the latter passes through the holes 14, 15 of the arms 10, 11, the retaining of the shaft in the collar.

In the embodiment shown in FIGS. 1 and 2, the entry zone 5 is formed by a counterbore 50 or cylindrical housing with a section greater than the section of the coupling zone 4.

In FIG. 2, the entry zone 5 has a vertical offset in the direction of the upper portion of the collar 1 in relation to the axis of insertion YY of the coupling zone. The vertical offsetting is provided in such a way as to provide in the entry zone 5 bearing surfaces 101 arranged in the extension of the bearing surfaces 111 of the coupling zone 4. This as such makes it possible to preserve the resistance in endurance of the collar/shaft connection. This also makes it possible to facilitate the mounting of the collar 1 on the shaft 2.

As the lower bearing zone of the entry zone 5 is retained, an enlargement then occurs on only the lateral and upper walls of the entry zone 5. Note that the enlargement can extend over the entire height of the lateral walls as shown in FIGS. 1, 2, 9 and 10 or, as shown in FIGS. 4, 5, 11, 12, over a portion only of the height of the lateral walls. The extent of the enlargement on lateral walls of the entry zone 5 will be determined in such a way as to provide both the fault-preventing for the shaft when the latter is not sufficiently engaged in the jaw and the resistance in endurance of the collar I shaft connection.

The presence of a counterbore 50 upstream of the coupling zone 4 as shown in FIG. 2, wherein the lateral and upper bearing zones have been suppressed and the lower bearing zone 101 retained makes it possible to prevent any transmission of force from the collar on the end portion 20 of the shaft 2 arranged in the entry zone 5 during the clamping of the screw while maintaining a resistance in endurance of the clamping collar 1/shaft 2 connection equivalent to that of a conventional clamping collar with the shaft.

Figure 4:
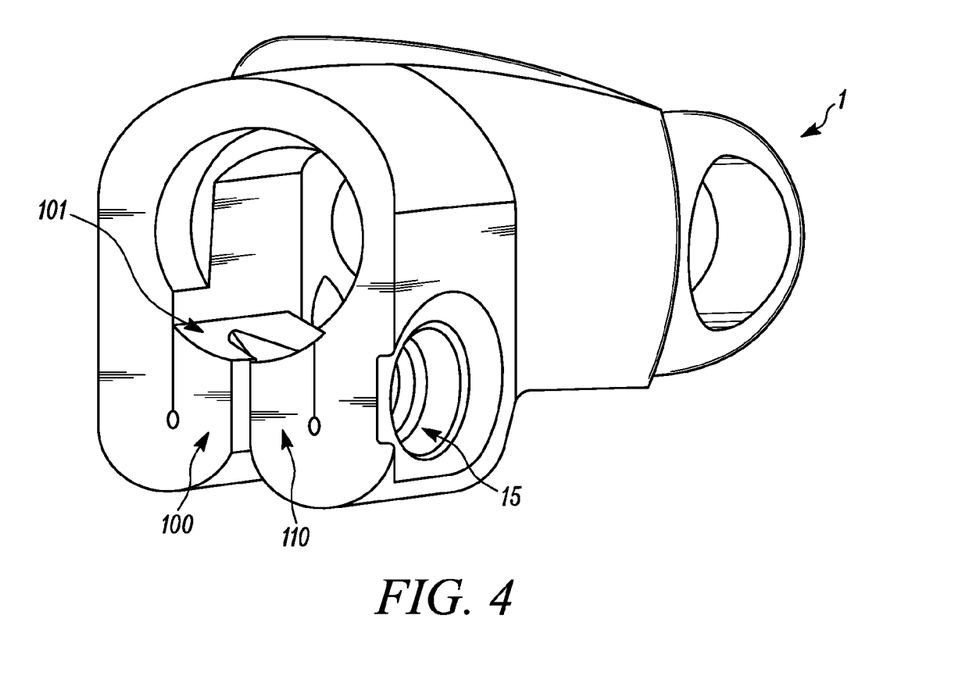
FIG. 4 shows a diagrammatical view in perspective of a device for connecting according to a second embodiment of the invention.
Figure 5:
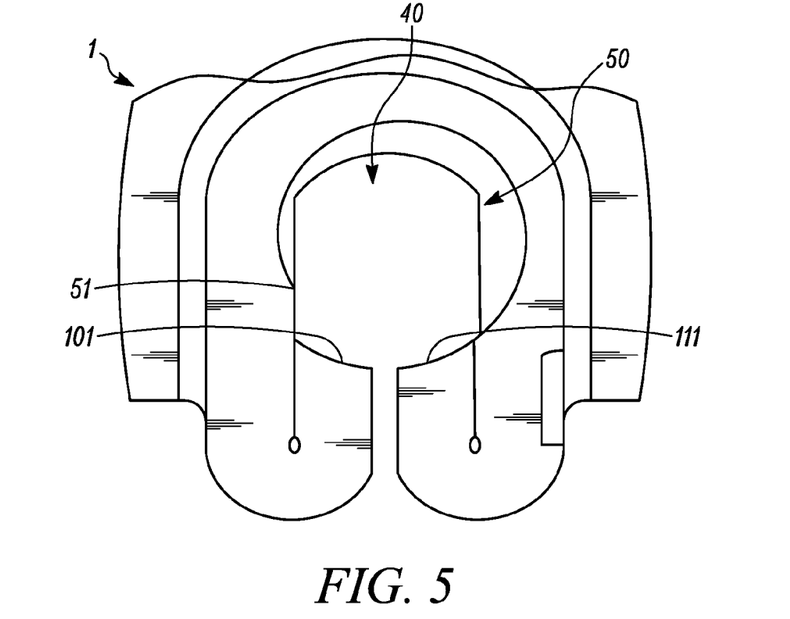
FIG. 5 shows a front view of the device of FIG. 4.

According to a particular embodiment shown in FIGS. 4 and 5, the entry zone 5 has a counterbore 50 that is offset vertically and horizontally. This vertical and horizontal offsetting has for advantage, in addition to suppressing any bearing zone on the lateral and upper walls of the counterbore, the arranging of an axial abutment 51 on the engagement surface. This axial abutment has for function, in cooperation with the shoulder arranged on the shaft 2, to allow for a stoppage in translation of the clamping collar on the shaft 2. Note that the shoulder is arranged on the shaft 2 so that when the shoulder 16 is stopped by the axial abutment 51, the groove for positioning and immobilising 21 is positioned facing the holes 14, 15.

Figure 6:
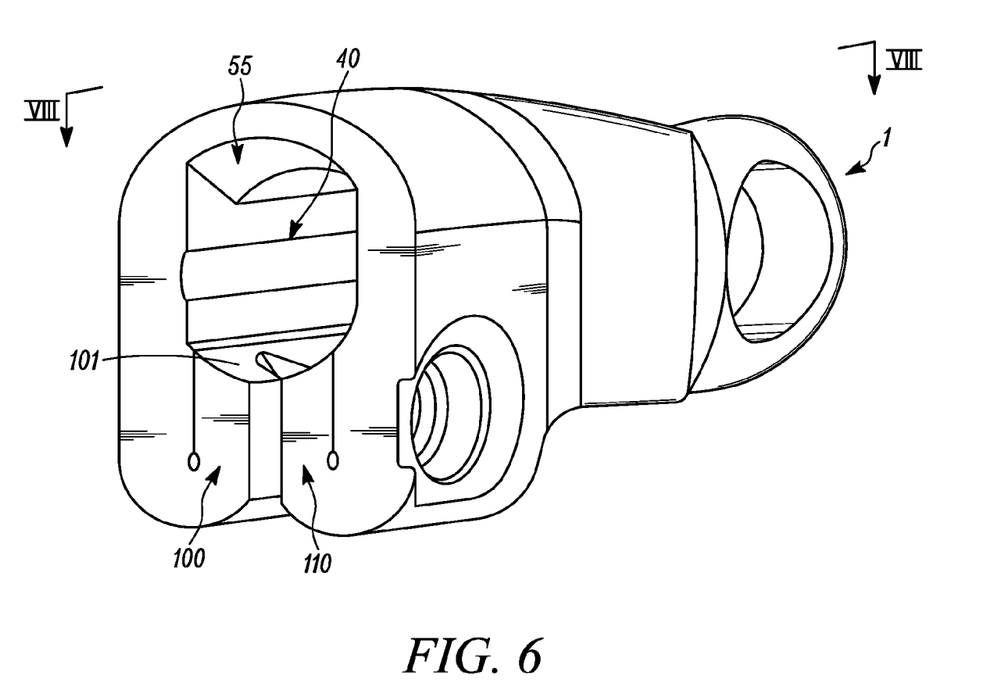
FIG. 6 shows a diagrammatical view in perspective of a device for connecting according to a third embodiment of the invention.
Figure 7:
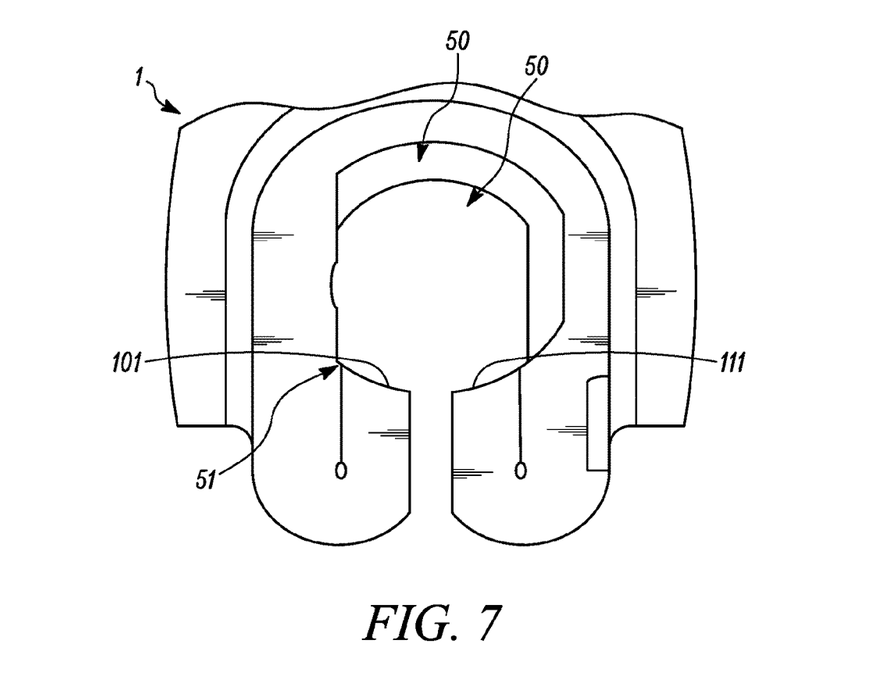
FIG. 7 shows a front view of the device for connecting of FIG. 6.
Figure 8:
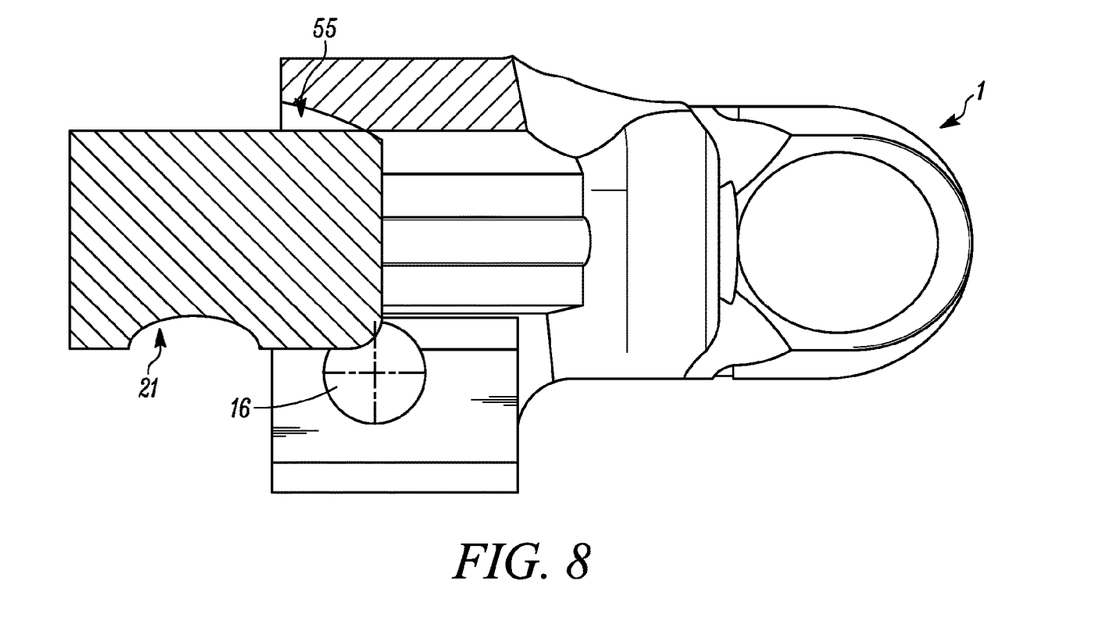
FIG. 8 shows a cross-section view according to the axis VIII-VIII of the device of FIG. 6.

According to another embodiment shown in FIGS. 6, 7 and 8, an entry zone 5 can be provided having a chamfered profile 55.

The chamfered profile shown in FIGS. 6 and 8 shows a vertical and horizontal offset of the profile in relation to the axis of insertion of the coupling zone 4, with the lower bearing zones being retained. Such a profile makes it possible, as the one shown in FIGS. 4 and 5, to remove any lateral and upper bearing zones while still retaining an axial abutment. It is of course obvious that a chamfered profile can be provided having only a vertical offset without however leaving the scope of the invention.

The characteristics and advantages described hereinabove for an entry zone formed of a counterbore also apply to an entry zone having a chamfered profile.

In the embodiments shown in the figures, the collar is comprised of a single-block part. It is of course obvious that the clamping collar is not limited to such a configuration.

In the embodiments shown in FIGS. 1 to 7, the extensions 100, 110 of the arms 10, 11, and therefore the bearing surfaces 101, 111, resulting from a folding of material at 180 degrees. It is of course obvious that the bearing surfaces can be carried out by any other manner without however leaving the scope of the invention.

In particular, and as shown in FIGS. 9 to 15, the extensions 100, 110 of the arms 10, 11, and therefore the bearing surfaces 101, 111, can result from a folding of material at 90 degrees but also from a half-cut 120 in the material on the external surfaces of the arms 10 and 11 followed by a displacement of material 121 by punching on the internal surfaces of the arms towards the interior of the entry zone 5.

The invention is described in what precedes by way of example. It is understood that those skilled in the art are able to carry out different alternatives of the embodiment of the invention without however leaving the scope of the invention.

The invention claimed is:

1. A device for operably coupling a steering column to a steering gear housing, the device comprising:
    a shaft defining an axis of insertion and having an insertion end portion and a clamping portion situated proximal to the insertion end portion,
    a clamping collar comprising two arms arranged relative to one another so as to define a cavity configured to receive and guide the shaft into a position of engagement with the clamping collar, the cavity including an entry zone and a coupling zone positioned such that upon insertion, the shaft enters the entry zone first, the entry zone and the coupling zone each defining an aperture presenting a diameter orthogonal to the axis of insertion of the shaft, and each of the two arms including structure defining a hole positioned orthogonally to the axis of insertion of the shaft when the clamping collar and shaft are in engagement, and
    a clamping screw passing through and engaging the structure defining the holes of each arm and tightenable to a set torque, thereby securing the shaft in a fixed position relative to the clamping collar,
    wherein the size of the aperture of the entry zone of the clamping collar cavity is larger than the size of the aperture of the coupling zone, so as to inhibit tightening of the clamping screw to the set torque when the insertion end portion is inserted only in the entry zone, and not in the coupling zone, the aperture of the entry zone vertically offset in relation to the aperture of the coupling zone,
    wherein the aperture of the coupling zone is shaped and sized to conform to an outer surface of the shaft when the clamping screw is tightened to the set torque, and
    wherein a portion of an internal surface of the entry zone formed by a portion of the two arms presents an entry zone bearing surface and a portion of an internal surface of the coupling zone presents a coupling zone bearing surface such that the entry zone bearing surface is arranged as an extension of the coupling zone extension surface, such that the entry zone bearing surface and the coupling zone surface are oriented for guiding the insertion portion of said shaft into said position of engagement with the clamping collar and contacting and supporting the shaft when the clamping screw is tightened to the set torque.

2. The device of claim 1, wherein the entry zone bearing surface and the coupling zone bearing surface are spaced apart.

3. The device of claim 1, wherein the entry zone bearing surface and the coupling zone bearing surface present a continuous surface therebetween.

4. The device of claim 1, wherein the entry zone is horizontally offset in relation to the axis of insertion.

5. The device of claim 1, wherein the holes open into the coupling zone, in the vicinity of the entry zone.

6. The device of claim 1, wherein the entry zone traverses between the holes and an insertion end of the clamping collar.

7. The device of claim 1, wherein the entry zone forms a counterbore.

8. The device of claim 1, wherein the entry zone has a chamfered profile.

9. The device of claim 1, wherein each of the two arms is folded over on itself.

10. The device of claim 1, wherein the bearing surfaces result from a folding of material to 90° of the extensions of the arms.

11. The device of claim 1, wherein each of the two arms is folded over on itself to form a continuous internal surface of the entry zone and the coupling zone.

12. A clamping collar configured to operably couple a shaft to a gear housing, the clamping collar comprising:
    two arms connected to one another by a connecting portion so as to define a cavity configured to receive and guide the shaft into a position of engagement with the clamping collar, the cavity defined by
    a coupling zone having an aperture shaped and sized to conform to an outer surface of the shaft, wherein a portion of the two arms within the coupling zone form a coupling zone bearing surface, and
    an entry zone having an aperture shaped and sized to be larger than the aperture of the coupling zone, wherein a portion of the two arms within the entry zone form an entry zone bearing surface in alignment with the coupling zone bearing surface,
    wherein the coupling zone bearing surface and the entry zone bearing surface are at least partially separated from one another by a groove or channel, and
    wherein the aperture of the entry zone is vertically offset in relation to the aperture of the coupling zone.

13. The device of claim 12, wherein the entry zone forms a counterbore.

14. The device of claim 13, wherein counterbore is horizontally offset in relation to the axis of insertion.

15. The device of claim 12, wherein the entry zone traverses between a pair of holes and a docking surface of the clamping collar.

16. The device of claim 12, wherein the coupling zone includes notched walls configured to cooperate with complementary surfaces arranged on the shaft.

17. The device of claim 12, wherein the coupling zone includes a six-section wall.

18. The device of claim 12, wherein the coupling zone includes a plurality of splines.

\* \* \* \* \*